US006857824B2

(12) United States Patent
Greenwood et al.

(10) Patent No.: US 6,857,824 B2
(45) Date of Patent: Feb. 22, 2005

(54) SEALING COMPOSITION AND ITS USE

(75) Inventors: Peter Greenwood, Göteborg (SE); Inger Jansson, Hisings Kärra (SE); Ulf Skarp, Göteborg (SE)

(73) Assignee: Akzo Nobel N.V., Arnhem (NL)

( * ) Notice: Subject to any disclaimer, the term of this patent is extended or adjusted under 35 U.S.C. 154(b) by 62 days.

(21) Appl. No.: 10/272,165

(22) Filed: Oct. 16, 2002

(65) Prior Publication Data

US 2003/0103814 A1 Jun. 5, 2003

Related U.S. Application Data

(60) Provisional application No. 60/330,445, filed on Oct. 18, 2001.

(51) Int. Cl.$^7$ .............................. C09K 17/00; E02D 3/12
(52) U.S. Cl. ....................... 405/263; 405/266; 405/270; 516/79; 516/111
(58) Field of Search .............................. 516/79, 78, 82, 516/111; 405/263, 266, 267, 270; C09K 17/00; E02D 3/12

(56) References Cited

U.S. PATENT DOCUMENTS

| | | | | |
|---|---|---|---|---|
| 2,630,410 A | | 3/1953 | Clapsadle et al. ........... 252/313 |
| 2,727,008 A | * | 12/1955 | Iler .............................. 516/83 |
| 2,892,797 A | * | 6/1959 | Alexander et al. ............ 516/79 |
| 3,374,180 A | * | 3/1968 | Marotta ........................ 516/83 |
| 3,920,578 A | * | 11/1975 | Yates ........................... 516/79 |
| 4,072,019 A | * | 2/1978 | Pearson ....................... 405/264 |
| 4,272,409 A | * | 6/1981 | Bergna .......................... 502/8 |
| 4,732,213 A | * | 3/1988 | Bennett et al. ............. 166/292 |
| 4,973,196 A | * | 11/1990 | Fuhr et al. ................ 405/129.7 |
| 5,066,420 A | * | 11/1991 | Chevallier ................... 516/82 |
| 5,368,833 A | | 11/1994 | Johansson et al. .......... 423/338 |
| 5,370,478 A | * | 12/1994 | Bartlett et al. ........... 405/129.6 |
| 5,396,749 A | | 3/1995 | Fukushima ................... 57/744 |
| 5,398,758 A | * | 3/1995 | Onan et al. ................. 166/292 |
| 5,836,390 A | | 11/1998 | Apps et al. ................. 166/281 |
| 6,060,523 A | * | 5/2000 | Moffett et al. .............. 516/110 |
| 6,372,805 B1 | * | 4/2002 | Keiser et al. ................. 516/79 |

FOREIGN PATENT DOCUMENTS

| | | | |
|---|---|---|---|
| EP | 530 600 A1 | 3/1993 | ........... C09K/17/00 |
| GB | 1 294 131 | 10/1972 | ............. E02D/3/14 |
| GB | 2 124 276 A | 2/1984 | ............. E02D/3/12 |
| JP | 59-93788 | 5/1984 | ........... C09K/17/00 |
| JP | 5-70776 | 3/1993 | ........... C09K/17/00 |

OTHER PUBLICATIONS

J Karolin, C D Geddes, K Wynne and D J S Birch1, "Nanoparticle metrology in sol–gels using multiphoton excited fluorescence" Nov. 23, 2001, Meas. Sci. Technol. 13 (2002) 21–27.*
John D. Wright and Neil A. C. Higginson. "Effects of matrix variations on pH and Cu2+ sensing properties of sol–gel entrapped Eriochrome Cyanine R",J. Mater. Chem., 2004, 14 (2), 201–208. (abstract only).*
EKA Chemicals, "Colloidal Silica" from www.ekachemicals.com/csgrp/01/1_3_3.htm, 1 page © 2002.*
European Search Report No. EP 01 85 0174, dated Mar. 15, 2002.
Abstract of EP 530 600 A1 from EPO on–line data base esp@cenet.
Chemical Abstract No: 101: 115888s abstracting JP 59–93788.
Abstract of JP 5–70776 from Data Base WPI.
Iler et al., "Degree of Hydration of Particles of Colloidal Silica in Aqueous Solution," J. Phys. Chem., vol. 60, (1956), pp. 955–957.
Iler, Ralph K., "The Chemistry of Silica," John Wiley & Sons, Inc., (1979), pp. 407–409.

* cited by examiner

Primary Examiner—Robert J. Sandy
Assistant Examiner—Katherine Mitchell
(74) Attorney, Agent, or Firm—Michelle J. Burke; Lainie E. Parker

(57) ABSTRACT

The present invention relates to a method for sealing rock or soil comprising inserting a sealing composition obtained by mixing a silica sol and at least one gelling agent, wherein the silica sol has an S-value higher than about 72%, a method for preparing the sealing composition and the composition obtained from the method.

8 Claims, No Drawings

SEALING COMPOSITION AND ITS USE

This application claims priority of U.S. Provisional Patent Application No. 60/330,445, filed Oct. 18, 2001.

The present invention relates to a method for sealing rock or soil comprising inserting a sealing composition obtained by mixing a silica sol having an S-value higher than about 72% and at least one gelling agent into said rock or soil. The invention also relates to such a composition and a method for preparing the composition.

BACKGROUND OF THE INVENTION

The requirements and performance of compositions used for sealing rock and soil have increased in the course of time. These requirements involve both improved environmental and technical aspects. Previously, various plastics and polymers involving toxic substances have been employed to seal water leaks in e.g. concrete walls, tunnels, or cavities formed on the back side of a concrete wall. Such sealing chemicals have in a number of cases caused contamination of groundwater and health problems to e.g. construction workers handling them. However, attempts have been made to replace hazardous products with more environmentally adapted ones. New products have also been sought for to meet the recently imposed leakage restrictions. In some instances, water leakage levels below 1 liter/(min*100 meters) have been the upper threshold on constructions sites of tunnels. This have forced the suppliers to provide technically improved sealing products. U.S. Pat. No. 5,396,749 describes a method for cutting off water flow by grouting whereby troubles due to water leakage and collapse of ground is prevented. The cut-off agent is prepared by mixing e.g. colloidal silica, inorganic salt, and a water-soluble urethane polymer.

However, the strength of these agents has shown to be insufficient in several applications, particularly where the agent during injection and gelling is exposed to a high water pressure. Especially unstable agents have during the ageing phase resulted in a fairly low long term strength. Sealing agents have also been used for sealing soil to prevent leakage of contaminants in subterranean areas like buried sources, waste dumps etc. U.S. Pat. No. 5,836,390 describes a method of forming subsurface barriers where a viscous liquid comprising e.g. polybutenes, polysiloxanes, and colloidal silica is injected.

It is desirable to provide an environmentally adapted liquid cut-off agent having a high long term strength, especially in the field of sealing rock, where the cut-off agents may be subjected to high water pressure from groundwater. It is also desirable to provide durable products which resist washout forces and having a low permeability, i.e. impermeable to water and other liquids.

It is an object of the present invention to provide such products solving the drawbacks of the prior art referred to above.

THE INVENTION

The present invention relates to a method for sealing rock or soil comprising inserting a sealing composition obtained by mixing a silica sol having an S-value higher than about 72% and at least one gelling agent into said rock or soil.

Preferably, the sealing concerns cutting off a liquid flow in a leaking part or cavity. The present invention also relates to a method for preparing a sealing composition, which comprises mixing a silica sol having an S-value higher than about 72% and at least one gelling agent. The present invention also relates to a sealing composition obtained by this method.

It has been surprisingly found that a silica sol having a high S-value, i.e. an S-value higher than about 72%, can impart a high long term gel strength to a sealing composition. The term "gel strength" as used herein is a measure of the shear and compressive strength of the gelled sealing composition that develops with time. A high long term strength provides a durable sealing. It has also been found that the sealing composition according to the present invention has a low permeability, which indicates good sealing characteristics.

The "S-value" characterises the extent of aggregation of the silica particles in the silica sol, i.e. the degree of aggregate or microgel formation. The S-value of the silica sol has been measured and calculated according to the formulas given in Iler, R. K. & Dalton, R. L. in J. Phys. Chem. 60(1956), 955–957.

The S-value is dependent on the silica content, the viscosity, and the density of the silica sol. A high S-value indicates a low microgel content. The S-value represents the amount of $SiO_2$ in percent by weight present in the disperse phase of the silica sol. The degree of microgel can be controlled during the production process of silica sols as further described in e.g. U.S. Pat. No. 5,368,833.

According to one preferred embodiment of the invention, the S-value is higher than about 73%, preferably higher than about 74%, even more preferably higher than about 75%. Preferably, the S-value is lower than about 90%, and most preferably lower than about 85%.

The silica sol comprises silica particles suitably having an average particle diameter ranging from about 3 to about 150 nm, preferably from about 12 to about 50 nm, and most preferably from about 12 to about 40 nm. Suitably, the silica particles have a specific surface area of from about 20 to about 900, preferably from about 40 to about 230, and most preferably from about 60 to about 220 $m^2/g$. The density of the silica sol suitably is from about 1 to about 1.6, preferably from about 1.1 to about 1.5, and most preferably from about 1.2 to about 1.4 $kg/m^3$.

The silica sol is suitably substantially monodisperse, i.e. having as narrow particle size distribution as possible. Suitably, the silica particles have a relative standard deviation of the particle size distribution lower than about 15% by numbers, preferably lower than 10% by numbers, and most preferably lower than about 8% by numbers. The relative standard deviation of the particle size distribution is the ratio between the mean particle size by numbers and the standard deviation of the particle size distribution. The silica particles of the silica sol are suitably dispersed in water in presence of stabilising cations such as $K^+$, $Na^+$, $Li^+$, $NH_4^+$ or the like or mixtures thereof. However, also other dispersions such as organic solvents, e.g. lower alcohols, acetone or mixtures thereof may be used. The pH of the dispersion suitably is from about 1 to about 12, preferably from about 7 to about 11. As long as the silica sol remains stable, i.e. substantially without any aggregation or gelation, a high silica content is preferred in the silica sol. This is beneficial in view of the superior technical performance of a highly concentrated silica sol and the reduced transportation cost thereof. According to one embodiment, the ingredients, i.e. the silica sol and the gelling agent are separately added to the applied point to be sealed. This may be performed e.g. by means of so called jet grouting, wherein the ingredients are mixed in situ, e.g. in the soil.

By the terms "silica sol" and "silica particle" are herein also meant to comprise e.g. aluminium-modified silica particles and sols, and boron-modified silica particles and sols.

Boron-modified silica sols are described in e.g. U.S. Pat. No. 2,630,410. Aluminium modified silica sols, sometimes also referred to as aluminate modified silica sols, can be prepared by adding an appropriate amount of aluminate ions, Al(OH)$_4$, to a conventional non-modified silica sol under agitation and heating. Suitably, a diluted sodium or potassium aluminate solution corresponding to an aluminium modification of from about 0.05 to about 2, preferably from about 0.1 to about 2 Al atoms/nm$^2$ surface area of the silica particle is used. The aluminium-modified silica particles comprise inserted or exchanged aluminate ions, creating aluminosilicate sites having a fixed negative surface charge. The pH of the aluminium-modified silica sol can be adjusted, preferably by means of an ion exchange resin, suitably to a pH ranging from about 3 to about 11, preferably from about 4 to about 10. The aluminium modified silica particles suitably have an Al$_2$O$_3$ content of from about 0.05 to about 3 wt %, preferably from about 0.1 to about 2 wt %. The procedure of preparing an aluminium modified silica sol is further described e.g. in "The Chemistry of Silica", by Iler, K. Ralph, pages 407–409, John Wiley & Sons (1979) and in U.S. Pat. No. 5,368,833.

The gelling agent suitably is an inorganic salt or acid, an organic salt such as sodium acetate, or acid such as acetic acid, but preferably an inorganic salt such as potassium chloride, calcium chloride, sodium chloride, magnesium chloride, magnesium sulphate, potassium iodide magnesium nitrate, sodium nitrate, potassium nitrate, calcium nitrate, and sodium silicate or mixtures thereof, preferably calcium chloride, sodium chloride or potassium chloride, and most preferably sodium chloride, sodium aluminate.

A gel time regulator such as an acidic triacetine (glycerine triacetate), diacetine, Glauber's salt (NaSO$_4$*10H$_2$O), sulphuric acid, phosphoric acid or mixtures thereof may also be added to the sealing composition to control the gelation thereof.

The term "gel time", as used herein, means the amount of time elapsed from the moment of mixing the ingredients making up the sealing composition until the time when the sealing composition becomes too viscous to move or insert to a leaking point. The viscosity is suitably controlled in such way that a homogeneous moving front of the composition is formed moving in the direction of the point to be sealed. Suitably, the initial viscosity of the sealing composition is from about 3 to about 100, preferably from about 4 to about 30 mPas. The gel time may easily be controlled by adjustment of the amount of gelling agent. Sometimes, instantaneous gelling without substantial dilution of the composition is necessitated to provide a gelled pressure-resisting sealing composition. A short gel time may be optimal in cracks being relatively ground and where the risk for rapid dilution of the sealing composition exists. In some cases, it is essential especially in cracks that the gelling preferably should not start before the front of the inserted composition has fully penetrated the crack. Usually, the gel time ranges from about 1 to about 120, preferably from about 2 to about 60, more preferably from about 5 to about 40, and most preferably from about 5 to about 20 minutes in rock sealing. In soil sealing, the gel time usually ranges from about 5 minutes to about 24 hours, preferably from about 10 minutes to about 6 hours, and most preferably from about 15 minutes to about 3 hours.

The ingredients may be mixed at ambient temperature. The gelling agent is suitably added to the silica sol in an aqueous solution in a concentration from about 1 to about 30 wt %, preferably from about 2 to about 15 wt %. The silica sol, to which the gelling agent suitably is added, suitably has a silica content of from about 1 to about 70, preferably from about 20 to about 60, and most preferably from about 35 to about 50 wt %. A high silica content in the silica sol may in many instances be favourable due to reduced transportation costs of silica sol.

The silica content in the sealing composition suitably is from about 1 to about 60, preferably from about 15 to about 50, and most preferably from about 30 to about 45 wt %. A high silica content minimises shrinkage and maximises long term strength. The weight ratio of silica to gelling agent depends on the application and may vary depending on the application. Suitably, the weight ratio of silica particles: gelling agent is from about 400:1 to about 10:1, preferably from about 200:1 to about 20:1.

The gelling agent content in the sealing composition may vary depending on the type of gelling agent used. However, the gelling agent content suitably is from about 0.1 to about 10, preferably from about 0.2 to about 5 wt % of the composition. If sodium chloride is used as gelling agent, the content suitably is from about 0.2 to about 5, preferably from about 1 to about 3, and most preferably from about 1.5 to about 2 wt % of the composition. If calcium chloride is used as gelling agent, the content suitably is from about 0.1 to about 2, preferably from about 0.2 to about 1, and most preferably from about 0.25 to about 0.5 wt % of the composition.

According to a preferred embodiment, the sealing composition is inserted by injecting the silica sol separately to a leaking part or cavity whereby the sealing composition is formed in situ, e.g. in a crack of a rock or a cavity in the soil. The gelling agent may thus also be separately injected to the leaking part or cavity. This may be performed e.g. by injecting the sealing ingredients simultaneously, e.g. by placing injection nozzles for the silica sol and the gelling agent in parallel such that the gelling agent and the silica sol can be injected at the same time without premixing. However, in certain leaking parts or cavities, e.g. in soil, a gelling agent in the form of e.g. a salt may already be present in the soil in such quantity that no further gelling agent need to be added to form a sealing composition. Hence, in one preferred embodiment of the invention, solely silica sol is separately injected to a leaking part or cavity. The method can generally impart cutting off of any liquid flow of e.g. water and aqueous solutions, organic solutions etc, but the method is principally adapted to cut off flow of water and aqueous solutions.

The sealing composition may also be inserted to a leaking part or cavity by means of other methods such as jet grouting, in which at least a part of the material constituting the leaking part or cavity is removed to add the sealing composition and then reset to the same point from which it was earlier removed with the sealing composition incorporated therein. This method is preferably adapted to be used in the sealing of soil.

According to one preferred embodiment, the silica sol and the gelling agent are mixed immediately before injection. In this context, the wording "immediate" means from about 0 to about 30 seconds, preferably from about 0 to about 15 seconds. This way of mixing the ingredients of a composition is often referred to as in-line mixing.

According to one preferred embodiment, the sealing composition may also be prepared in a batch process in advance and used suitably within 60 minutes, and preferably within 30 minutes before insertion of the composition. This way of preparing the sealing composition, however, necessitates a sufficiently stable sealing composition that can be stored without substantial gelling until the moment of insertion. The injection time of the sealing composition is suitably from about 1 minute to about 1 hour, preferably from about 5 minutes to about 30 minutes. The injection/penetration depth varies of course with the leak to be sealed. However, the method of the present invention is particularly beneficial for depths from about 0.5 to about 50 metres, preferably from about 5 to about 30 metres. The injection pressure suitably is from about 1 to about 50 bar, preferably from about 2 to about 25 bar.

The sealing composition is principally adapted to provide barriers in the subsurface for preventing leakage of water. The sealing of rock involves insertion of the sealing composition into e.g. a cavity such as a microcrack, especially to control groundwater leakage, e.g. in tunnels. By the term "microcrack" is usually meant a cavity having a diameter lower than 20 μm. As the diameter of the silica particles in the silica sol is from about 10 to about 100 nm, sealing compositions containing such silica particles are of course suitable for injection into microcracks.

The invention being thus described, it will be obvious that the same may be varied in many ways. Such variations are not to be regarded as a departure from the gist and scope of the present invention, and all such modifications as would be obvious to one skilled in the art are intended to be included within the scope of the claims. The following examples will further illustrate how the described invention may be performed without limiting the scope of it.

EXAMPLE 1

Sealing compositions were prepared from a salt solution of 1.7 M sodium chloride which was added under agitation to 200 g of different silica sol products as defined in the tables below. The amount of salt solution added was 40 g solution in all compositions. The compositions were aged up to 672 hours to evaluate the long term shear strength. In table 1, one set of the compositions was exposed to an increased temperature of 55° C. and another set was exposed to a pH of 12 to accelerate the ageing of the sealing composition. The calculation of the particle diameter of the silica particles was made by Sear's method for calculating the specific surface area. The shear strength test was performed with the fall cone test according to the Swedish Standard SS 02 71 25.

Also the compressive strength was determined for the sealing compositions. This was made by compression tests in which a load-frame, a pressure-head with the same diameter as the sample, a load cell with a plane surface where the sample is placed between the load-cell and the pressure-head, a displacement transducer, a battery powered data-logger, a signal processing software were used. The load frame forces the pressure-head to move in vertical direction. The frame is of same type as used in machine shops for controlled vertical drilling. The load is controlled by weights, which loads the load-head without any transmission (dead weight). The pressure-head consists of a rigid steel cylinder with 50 mm diameter. The load-cell has a capacity for 300 kg. The load-cell forms a plane surface. The sample is situated between the load-cell and the pressure-head. The accuracy for the load-cell is within 0.1 kg. The displacement transducer has a stroke capacity of 5 mm. The error of the actual transducer was tested by the factory to max 0.4%. The data-logger used for the tests is developed to monitor vibrations and deformations during field conditions. The logger monitors continuously during the test. The compression tests were performed only for samples cured during 28 days. The mould-cylinders size was 50 mm diameter and 25 mm height. The mould cylinders were positioned in a pot with a plane bottom. The sealing composition was then poured up to the upper end of the cylinders. All samples were cured in 20° C. water bath at pH 10. Only the cross sections where exposed to water. Before testing, the samples were separated from the mould-cylinders.

TABLE 1

| Compositions made with the following sols: | Particle diameter (nm) | S-value | Surface area on product base (m²/g) | Shear strength (kPa), 55° C., pH 10, 672 h | Shear strength (kPa), 20° C., pH 12, 672 h |
|---|---|---|---|---|---|
| Sol 1 | 17 | 77 | 68 | 326 | — |
| Sol 2 | 12 | 76 | 88 | 640 | 475 |
| Sol 3 | 11 | 70 | 100 | 218 | — |
| Sol 4 | 7 | 70 | 108 | 250 | 70 |
| Sol 5 | 5 | 45 | 75 | 48 | 39 |

In table 1, it can be seen that the sealing compositions made from silica sols having an S-value according to the invention results in a higher gel strength after 672 hours than the composition prepared from the comparative silica sols 3–5, both at ambient temperature and at a pH of 12 (which accelerates the ageing of the products) and at a pH of 10 and a temperature of 55° C. (which also results in a faster ageing process).

TABLE 2

| Compositions made from the following sols: | Particle diameter (nm) | S-value | Surface area on product base (m²/g) | Compressive strength (kPa)/max load |
|---|---|---|---|---|
| Sol 6 | 35 | 90 | 40 | 48 |
| Sol 1 | 17 | 77 | 68 | 50 |
| Sol 2 | 12 | 76 | 88 | 45 |
| Sol 3 | 11 | 70 | 100 | 11 |
| Sol 5 | 5 | 45 | 75 | 11 |

In table 2, it can be seen that the sealing compositions prepared from the silica sols with an S-value in accordance with the present invention impart higher compressive strength than the sealing compositions made from the comparative silica sols 3 and 5.

What is claimed is:

1. A method for preparing a sealing composition comprising mixing a silica sol and at least one gelling agent, wherein the silica sol has an S-value higher than about 72% and a silica content in the range from about 20 wt % to about 70 wt %.

2. A method according to claim 1, wherein the composition has a gelling agent content from about 0.2 to about 5 wt %.

3. A method according to claim 1, wherein the composition has a weight ratio of silica particles to gelling agent from about 400:1 to about 10:1.

4. A method according to claim 1, wherein the gelling agent is selected from the group consisting of potassium chloride, sodium chloride, calcium chloride, magnesium chloride, magnesium nitrate, magnesium sulfate and mixtures thereof.

5. A sealing composition obtained by mixing a silica sol and at least one gelling agent, wherein the silica sol has an S-value higher than about 72% and a silica content in the range from about 20 wt % to about 70 wt %.

6. A sealing composition according to claim 5, wherein the S-value is higher than about 75%.

7. A sealing composition according to claim 5, wherein the silica sol comprises silica particles having a relative standard deviation of the particle size distribution lower than about 15% by numbers.

8. A sealing composition according to claim 5, wherein the composition has a gelling agent content from about 0.2 to about 5 wt %.

* * * * *